Feb. 13, 1945.                B. E. LUBOSHEZ                2,369,473
                        EXPOSURE CONTROL FOR CAMERAS
                        Filed Jan. 30, 1943        2 Sheets-Sheet 1
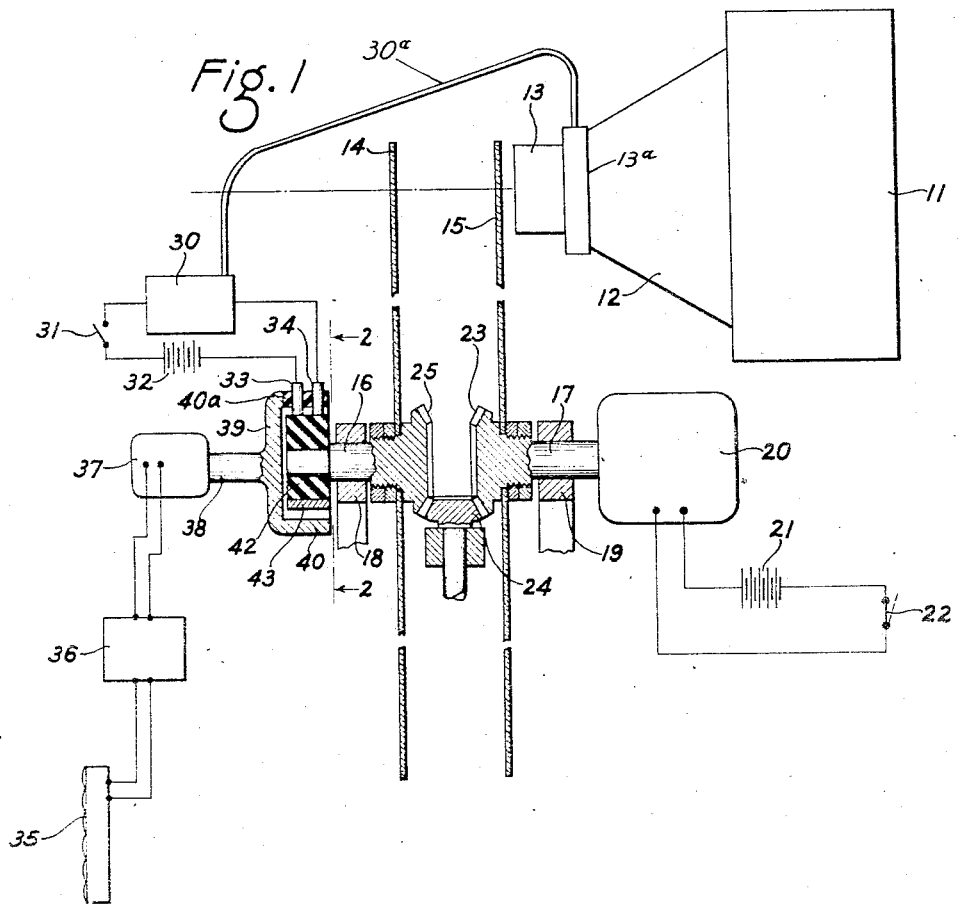
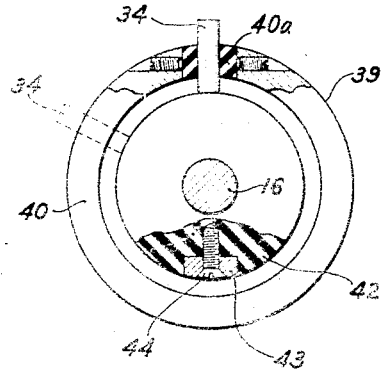
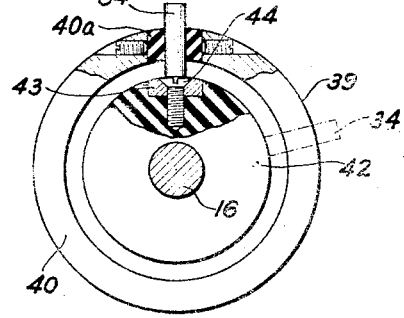
Benjamin E. Luboshez
INVENTOR
BY
ATTORNEYS

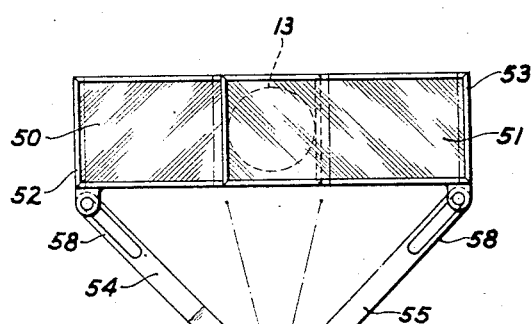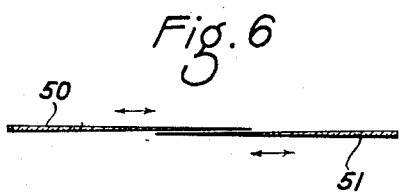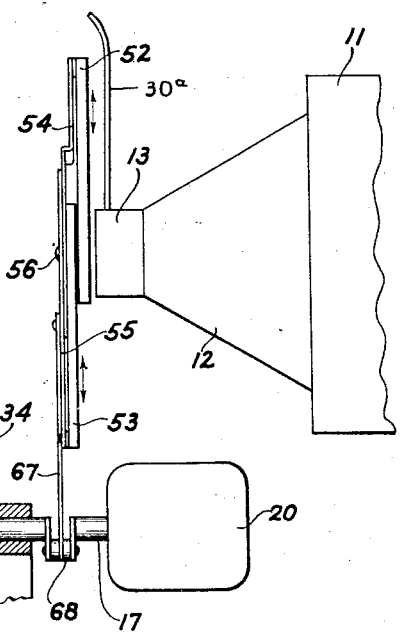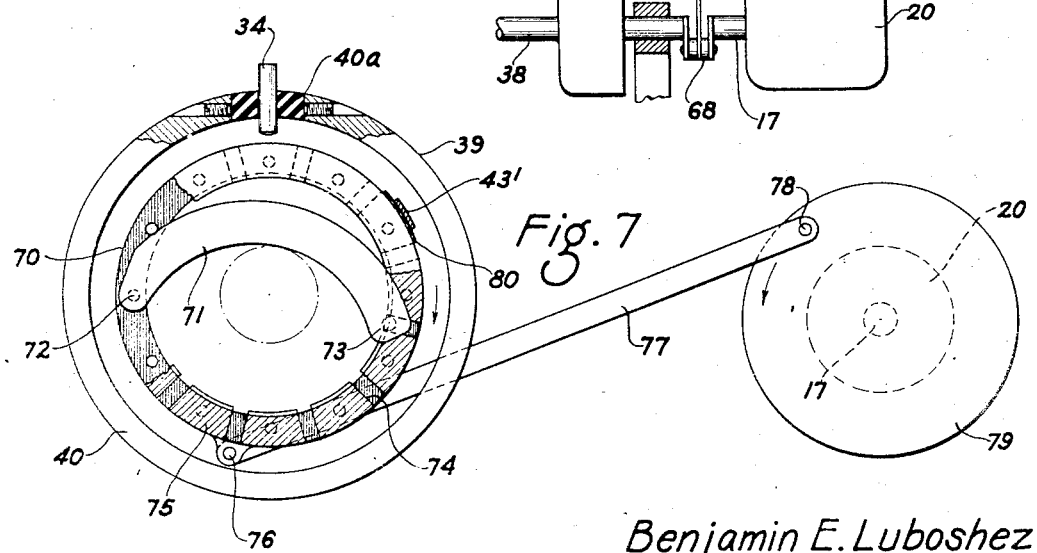
Benjamin E. Luboshez
INVENTOR
BY
ATTORNEYS

Patented Feb. 13, 1945

2,369,473

UNITED STATES PATENT OFFICE 2,369,473

EXPOSURE CONTROL FOR CAMERAS

Benjamin E. Luboshez, Rochester, N. Y., assignor to Eastman Kodak Company, Rochester, N. Y., a corporation of New Jersey Application January 30, 1943, Serial No. 474,098

20 Claims. (Cl. 95—10)

The present invention relates to photographic cameras, and more particularly to an exposure control for cameras for use on aircrafts.

One object of the invention is the provision of an apparatus for automatically controlling the light conditions to which the sensitized material of the camera is subjected during an exposure.

A primary object of the invention is the provision of an exposure control device which is substantially immediate in its response to changing light conditions.

Another object of the invention is the provision of a light-sensitive member for controlling the exposure light conditions and also the timing of the exposure.

A further object of the invention is the provision of a variable light-transmitting member movably positioned in the path of the light rays passing to the camera lens, and the utilization of a light-sensitive member for controlling the operation of the exposure control means only when the proper portion of the light-transmitting member is in position in the path of the light rays passing to the lens.

Yet another object of the invention is an exposure control means which is so related to the camera as to permit the easy removal of the latter for replacement or repairs without disturbing the control mechanism.

A still further object of the invention is the provision of an automatic control device which is positive in its operation, automatic, simple and highly effective and reliable in use.

To these and other ends, the invention resides in certain improvements and combinations of parts, all as will be hereinafter more fully described, the novel features being pointed out in the claims at the end of the specification.

In the drawings:

Fig. 1 is a side view of the control apparatus constructed in accordance with one embodiment of the present invention, with parts in section, showing the relation of the control apparatus to a camera designed for use on aircrafts;

Fig. 2 is an end view of a portion of the mechanism illustrated in Fig. 1 taken substantially on line 2—2 thereof, with parts in section, showing the relation of the control contacts when in one position in which the circuit of the exposure control means is open so that an exposure will not be made;

Fig. 3 is a view similar to Fig. 2 with the contacts in engaging or circuit closing position to close the circuit of the exposure control means to permit the making of an exposure;

Fig. 4 is a front view of an exposure control apparatus constructed in accordance with another embodiment of the invention;

Fig. 5 is a top plan view of the apparatus illustrated in Fig. 4 showing the relation thereof with the camera;

Fig. 6 is a plan view of the density wedges or plates illustrated in Figs. 4 and 5, but on a larger scale than the latter and detached from their operating mechanism to more clearly show the structure and arrangement of the tapered and oppositely oriented density plates; and Fig. 7 is a front view of still another embodiment of an exposure control means constructed in accordance with the present invention.

Similar reference numerals throughout the various views indicate the same parts.

When operating aircraft cameras on single seater fighter planes, experience has shown that under war conditions, it is not practicable for the pilot to alter the opening of the diaphragm or its equivalent in accordance with changing light conditions. The method, at present in use, consists of setting the exposure for each flight before the plane takes off in the hope that anticipated light conditions will prevail. The disadvantages of such an arrangement will be readily apparent to those in the art.

In accordance with the present invention, a photoelectric cell and circuit is utilized to control the exposure conditions. Photoelectric exposure control is, of course, not new, but does not appear to have been used in connection with aerial photography. A practical difficulty lies in the impossibility of locating a light control diaphragm in the "stop plane" of the objective without separating the parts. Under present conditions, and partly owing to the method of selecting objectives for military use, modification of the lens mounting cannot be undertaken. According to the present invention, the means used for controlling the exposure does not have to be located in any special position in regard to the lens, and, hence, can be conveniently located in front of the lens.

The preferred method of exposure control of the present invention embodies the use of light transmitting or limiting means such as a graded density wedge preferably arranged in the form of a disk, although not necessarily limited thereto, as will be later pointed out. If the gradation can be arranged to give a linear light transmission curve, there is no difficulty in obtaining an even density over the entire area of the lens in all positions of the disk. All that is necessary is oppositely oriented wedges of identical gradation placed over the front of the objective. This, however, involves a slight light loss in the zero position, and this can be avoided by using two oppositely rotated and oppositely graded identical density wedge disks. Direct movement of the wedge disks, diaphragms, or other mechanisms by a photoelectric cell current, suitably amplified, is, however, usable only when there are no rapid changes in light values since the inertia of the moving parts, with the large lenses employed, prevents immediate response. In aerial photography, however, very rapid variations in exposure conditions may take place and the following methods enable these variations to be quickly, easily, and accurately followed.

Two oppositely rotating and oppositely graded density wedge disks are motor-driven at a constant speed, and the magnitude of the photoelectric cell current determines the instant at which the exposure is allowed to take place, and thus selects the moment of exposure to correspond with a definite position of the wedges with regard to the camera lens. In practice, the pilot may press the exposure control button at any instant, but the exposure does not take place immediately by this method as a small portion of a second must elapse before the two disks are in the required exposure position determined by the photocell, as will be hereinafter more fully explained. This time delay can be reduced to almost any desired value.

Many practical mechanisms may be employed to carry out such a method of exposure control. The preferred form of such a mechanism is shown in Figs. 1 to 3 of the drawings in connection with a camera designed for use on an aircraft. The camera 11 is provided with a forwardly extending portion 12 terminating in a lens mount 13 which houses the objective lens, not shown. As shown in Fig. 1, the shutter 13A may be positioned behind the lens mount 13 or it may be housed within the lens mount as illustrated in Fig. 5. As this camera is of a well-known construction, details thereof are not shown, for obvious reasons. The lens used in aircraft cameras are of relatively large diameter, as is also well-known. As mentioned above, it is not practical for the pilot to alter the diaphragm opening with changing light conditions. Furthermore, as such diaphragms have a large diameter, they are not adapted for direct adjustment by means of a light-sensitive member, such as a photoelectric cell.

In order to avoid these difficulties in providing the desired exposure control for such cameras, the preferred form of the present invention utilizes a pair of oppositely oriented density disks or wedges 14 and 15 of identical gradation placed in spaced relation in front of the camera lens and on the optical axis thereof, as clearly shown in Fig. 1. These wedges 14 and 15 are preferably in the form of flat disks mounted on and suitably secured to shafts 16 and 17 respectively so as to rotate as a unit therewith. Suitable bearings 18 and 19 are provided for supporting the shafts 16 and 17.

The density wedges 14 and 15 may then be rotated to bring the proper portions thereof into alignment with the camera lens so that the light impinging on the sensitive film or plate in the camera is adjusted in accordance with the light conditions then prevailing. However, as the light conditions may change, the wedges must be continually altered to meet such changes. Manual movement of the wedges is undesirable, for obvious reasons. Furthermore, as the wedges are of a relatively large diameter they are not adapted for direct movement by means of a photoelectric cell or similar device due to the fact that the inertia of the wedges prevents immediate response to changing light conditions.

To overcome these difficulties, the wedges 14 and 15 are preferably rotated continuously at the same speed, but in opposite directions, and the exposure is then delayed, by means to be later described, until the proper portions of the wedges have been moved into position in front of the camera lens, thus insuring that the proper light will be transmitted to the sensitive film or plate. In order to thus drive the wedge disks 14 and 15, the shaft 17 has secured thereto, in any suitable and well-known manner, an electric motor 20 connected to a suitable source of electrical energy such as a battery 21. A switch 22 may be provided in the battery circuit to open the circuit of the motor 20 to stop the latter when the camera is not in use. However, when the switch 22 is closed, the motor 20 will drive the shaft 17 and disk 15 as a unit. Rotation of the shaft 17 is transmitted to the shaft 16 by means of a bevel gear 23 carried on the shaft 17 and meshing with an intermediate idler bevel gear 24 connected to a bevel gear 25 carried by the shaft 16, all as shown in Fig. 1. By means of this arrangement, the shafts 16 and 17 and the wedges 14 and 15 are rotated at the same angular speed but in opposite directions to continuously change the portions of the two disks arranged in alignment with the camera lens, as will be readily apparent.

The shutter actuating mechanism, which is preferably of the setting type and necessitates the setting of the shutter before the exposure is made, is schematically indicated at 30, and as this mechanism is of well-known construction, a detailed showing is not deemed necessary for those in the art to fully understand the present invention. A suitable connection 30A is provided between the shutter and its actuating mechanism 30. The mechanism 30 is connected through a main control switch 31 to a source of power, such as a battery 32, so that the closing of the switch 31 will tend to close the circuit to the shutter mechanism 30 to actuate the shutter to make an exposure, such exposure, however, to be momentarily delayed, in a manner to be later described, until the proper portions of the wedges 14 and 15 have been moved into position in front of the camera lens. The circuit to the shutter mechanism is finally closed to make the exposure by bridging or connecting a pair of terminals 33 and 34 arranged in the circuit of the shutter mechanism, as clearly shown in Fig. 1. Thus when the switch 31 is closed and the terminals 33 and 34 are connected, the exposure will be made, as is apparent.

The present invention, however, provides an arrangement by which the bridging or connecting of the terminals 33 and 34 is delayed, after the closing of the switch 31, until the wedges 14 and 15 have been rotated to bring the proper portions thereof into alignment with the camera lens so that the light impinging on the sensitive plate or film in the camera will be in accordance with the exact light conditions existing at that time. To secure this result, the terminals 33 and 34 are preferably mounted so that their positions may be shifted or changed in accordance with varying light conditions. Such changes are preferably under the control of a light responsive element such as a photoelectric cell 35 which quickly responds to any variation in light conditions, as is well-known.

In order that the cell 35 may thus be effective in moving or positioning the terminals 33 and 34, the cell 35 is connected through a suitable amplifier 36 to an electro-magnetic member 37, such as a motor or galvanometer, the rotor 38 of which carries a light cup-shaped member 39 having an axially extending annular rim or ring 40 of insulating material or provided with an insulating bushing 40a through which the terminals 33 and 34 project, as clearly shown in Fig. 1. As the cup 39 is quite light in weight, the inertia thereof is so small that its position will readily and quickly vary or change in response to changing light conditions incident on the cell 35. Thus, the change of light intensity of the cell 35 will immediately cause the cup 39 and ring 40 and, hence, the terminals 33 and 34 to shift or move to assume a new position relative to the shaft 16. The ring 40 is concentric with and surrounds the left end of the continuously rotating shaft 16 which carries the wedge 14. This end of the shaft 16 has mounted thereon an insulating sleeve 42 in which a single strip of metal 43 is recessed and held in position by screws 44. This metal strip 43 provides a single rotary contact which, when in registry with the terminals 33 and 34, as shown in Fig. 3, will serve to bridge or electrically connect the terminals to complete the circuit through the shutter mechanism 30, the switch 31 having, of course, been previously closed. Thus, each revolution of the shaft 16 will bring the rotary or selector contact 43 into bridging relation with the terminals 33 and 34. However, if the switch 31 has not been closed, the bridging of the terminals 33 and 34 will not be effective in actuating the shutter mechanism 30 to make the exposure. The terminals 33 and 34 may, therefore, be considered as a normally open switch, the closing of which times the exposure in definite relation to the position of the disk 14 and 15 relative to the axis of the camera lens. Furthermore, the cup 39, ring 40 and terminals 33 and 34 move as a unit with the rotor 38 and may, therefore, be broadly considered as a part thereof.

When an exposure is to be made, the operator first closes the switch 31; but, as the terminals 33 and 34 are not connected, the exposure is delayed until the shaft 16 has been rotated sufficiently to bring the single rotary contact 43 into electrical connection with the terminals 33 and 34, at which time the circuit to the shutter mechanism will be closed and the latter will be actuated to make the exposure. The amount of delay depends, of course, on the position of the control or selector contact 43 relative to the terminals 33 and 34. This time delay can be reduced to any desired or practical value and depends on the speed of rotation of the shafts 16 and 17. For example, if the shafts are rotated at ten revolutions per second, the maximum delay will be less than $\frac{1}{10}$ of a second. It is obvious, of course, that if the parts are in the position shown in Fig. 3, the closing of the switch 31 will result in an instantaneous exposure, and no delay is encountered.

Thus after the switch 31 is closed, the exposure will be made only when the parts reach the position shown in Fig. 3 at which time the rotary contact 43 connects the terminals 33 and 34. As pointed out above and to be later described, the cup member 39 and ring 40, as well as the terminals 33 and 34, will assume various angular positions relative to the shaft 16 for each different light condition incident on the cell 35. Such shifting of the ring 40 and the terminals 33 and 34, in response to varying light conditions, will accordingly vary the relative positions of the terminal 33 and 34 and the rotary contact 43 so that when the latter has been rotated to a position to connect the terminals 33 and 34 the disks 14 and 15 will then have been moved to positions to bring the proper portions thereof in front of the lens in accord with the then existing light conditions, as recorded by the cell 35. For example, with one light intensity on the cell 35, the electric current generated thereby will turn the rotor 38, cup 39 and ring 40 to position the terminals 33 and 34, say at the point shown in full line in Figs. 2 and 3. Now when the shafts 16 and 17 have been rotated to bring the rotary contact 43 to the position shown in Fig. 3, the terminals 33 and 34 will be connected and the exposure will be made, the switch 31, of course, having been previously closed. However, as the contact 43 rotates with the disks 14 and 15, definite portions of the latter will be arranged in alignment with the camera lens when the exposure is made, and these portions are those required by the then prevailing light conditions.

However, if the light condition incident upon the cell 35 changes, the electric current generated thereby will also change to move the terminals 33 and 34 to a new position as, for example, as shown in the broken line Fig. 2. It is now apparent that with the terminals 33 and 34 in this new position, the contact 43, and hence the disks 14 and 15, must be moved to a new position before connecting the terminals 33 and 34 to make the exposure. This new position will obviously bring different portions of the disks 14 and 15 into alignment with the camera lens, and these new portions are those required by the changed light conditions. A still different light condition may shift the terminals 33 and 34 to the dot and dash-line position, shown in Fig. 3. In this last position, the contact 43 must be turned into a still different position before connecting the terminals 33 and 34 to thus bring still different portions of the disks 14 and 15 in front of the camera lens when the exposure is made.

Thus each change in light intensity on the cell 35 will automatically shift the position of the terminals 33 and 34 to thus vary automatically the portions of the density wedges 14 and 15 which will be brought before the camera lens at the instant of exposure. However, in all cases, the portions of the disks 14 and 15 which are in front of the camera lens are those required by the light conditions which prevail at the instant the exposure is made. Furthermore, the light sensitive cell 35 is not required to move the relatively heavy and large disks 14 and 15, but rather the extremely light and readily responsive cup 39 so that the latter will readily, accurately and definitely change its position as the light condition varies, and will thus always be maintained in proper position. Also, the light transmitting characteristics of the wedges 14 and 15 vary in a periodic or cyclic relation for each rotation of the wedges, and the exposure is made at a definite instant in the cycle of operation or movement of wedges. At the instant of exposure, the light transmitting characteristics of the wedges are in a definite relation with the intensity of the light rays incident on the cell 35.

By thus shifting the terminals 33 and 34 in response to the light incident on the cell 35, the exposure will be delayed until the disks 14 and 15 have been moved to bring the proper portions thereof into alignment with the camera lens. As the disks 14 and 15 are rotated at the same constant speed, the instant of exposure may also be broadly considered as being controlled and/or timed in a definite relation to the rotation or movement of the density wedges or disks 14 and 15, as well as in relation to the positioning of the disks in front of the lens. Furthermore, as the cup 39 is quite light in weight its movement will be rapid and will easily and quickly follow any light variations incident upon the cell 35. By means of this arrangement, it is assured that the exposure will be made only when the proper portions of the wedges 14 and 15 are in position in front of the camera lens, thus assuring the making of an exposure in accordance with existing light conditions.

In the arrangement shown in Fig. 1, the oppositely oriented density wedges 14 and 15 are in the form of circular or annular disks which are continually rotated at the same speed but in opposite directions in front of the camera lens. In Figs. 4 and 5, however, the density members are in the form of tapered plates 50 and 51 of well-known design. These plates are oppositely oriented, as best shown in Fig. 6, and are mounted for continuous reciprocating movement forward and away from each other, as shown by the arrows in Fig. 6. The plates 50 and 51 are separately mounted in suitable open rectangular frames 52 and 53 respectively, the frames being mounted for reciprocating movement in suitable guides, not shown, for retaining the frames in proper position relative to the camera lens, as is best shown in Fig. 4.

A pair of arms 54 and 55 are pivotally connected at a fixed pivot 56 and have the upper ends 58 thereof pivotally connected by means of pin-and-slot connections to the lower sides of the frames 52 and 53, as best shown in Fig. 4. It is now apparent that if the lower ends 57 of the arms 54 and 55 are moved toward and away from each other, the plates 50 and 51 and their frames 52 and 53 will be reciprocated in front of the camera lens to vary the portions of the plates moved into alignment with the camera lens. Such movement may be made manually, but is undesirable for obvious reasons. It is much more desirable and satisfactory to conintuously move or reciprocate the density plates 50 and 51, and to then control the instant of operation when the proper portions of the plates are moved into position in front of the camera lens.

To secure this result, the lower ends of the arms 54 and 55 are connected by pivot pins 59 and 60 respectively to the ends 61 of a pair of arms or levers 62 and 63, the other ends 64 of which are pivotally connected by a pin 65 arranged to move vertically in a fixed slot or groove 66. One of the pins 59 or 60 has connected thereto one end of a rod 67, the other end of which is connected to a crank arm 68 formed on the shaft 17 so that each rotation of the latter will horizontally displace the rod 67 to move the lower end 57 of the arms 54 and 55 toward and away from each other to reciprocally move the density plates 50 and 51, as will be apparent. However, as the shaft 17 is continually rotated by means of the motor 20, the plates 50 and 51 will be continuously moved in a reciprocating manner transversely of the path of the light rays passing through the camera lens to continuously change the positions of the density plates 50 and 51 relative to the camera lens.

The shaft 17 also carries a rotary or selector contact which is identical with the contact 43 above described and which is arranged to connect or bridge the terminals 33 and 34 carried by the cup 39, as above explained in connection with Figs. 1 and 3. As the terminals 33 and 34 are adjusted in accordance with the light intensity on the cell 35, as pointed out above, and as the contact 43 rotates as a unit with the shaft 17 and in a definite relation to the movement of the plates 50 and 52, it is apparent that the contact 43 will connect the terminals 33 and 34 only when the proper portions of the plates 50 and 51 are in front of the camera lens. Thus the light passing to the sensitized film or plate in the camera will be automatically adjusted in accordance with the light conditions prevailing at the instant of exposure.

With such an arrangement, it is apparent that there will be two points when the proper portions of the plates 50 and 51 will be in front of the camera lens, namely, one point when the plates are moving towards each other, and the second point when the plates are moving away from each other. These pair of points occur one on each revolution of the shaft 17, and it is obvious that the exposure may be properly made at either of these points. However, in order to effectively utilize either of such points, a pair of contacts 43 would be required. As the time required for one rotation of the shaft 17 is however, quite small, as mentioned above, it has been found entirely satisfactory to employ only one contact 43, so that only one of the above-mentioned points will be used. Obviously, the selection of either of these control points is entirely arbitrary since both points are equally satisfactory. As the plates 50 and 51 are moving continuously, the exposure may be broadly considered as controlled in timed relation to the movement of the plates or the position thereof relative to the path of the light rays passing to the camera lens.

In the mechanism shown in Figs. 1 to 6, the disks 14 and 15 and the plates 50 and 51 have been shown as positioned in front of the camera lens. This is by way of illustration only, as it is contemplated that the disks or plates may be equally well arranged between the lens element of the camera objective or even between the objective and the sensitized film or plate. The latter particularly is true if a shutter of the focal plane type is used. It is preferred, however, to arrange the density disks or plates in front of the camera, thus permitting the ready and easy removal of the latter for repairs and replacements without necessitating any change or removal of the exposure control mechanism, the advantages of which are obvious.

Fig. 7 shows still another form of exposure control in which the density wedges 14 and 15 or the density plates 50 and 51 have been replaced by a variable light transmitting member in the form of an iris diaphragm 70. The latter is of a standard and well-known construction comprising a plurality of aperture-forming leaves 71 only one of which is shown and each of which has one end fixedly pivoted at 72 while the other end 73 is movable in a radial slot 74 formed in a movable control ring 75, all of which is well-known in the diaphragm art. It is apparent that the ring 75 may be manually moved to vary the aperture opening of the diaphragm 70, but such manual adjustment is obviously undesirable and unsatisfactory. As larger lenses are used in aerial cameras, large diaphragms are accordingly necessary, and due to the inertia of the diaphragm parts they do not lend themselves to direct adjustment by means of a photo-electric cell or other light responsive element. To this end, the present invention contemplates the continuous operation of the diaphragm leaves 71 to provide a continuously and periodically changing light opening or aperture, and the controlling of the instant of exposure of the shutter mechanism when the aperture opening is in accordance with the intensity of the light incident upon the cell 35.

To secure this result, the ring 75 has pivotally connected thereto at 76, one end of a crank arm 77, the other end of which is eccentrically connected at 78 to a throw plate 79 carried by the shaft 17, as clearly shown in Fig. 7. It is now apparent from an inspection of Fig. 7 that continuously rotating the shaft 17 continuously actuates the diaphragm ring 75 to cause the leaves 71 to continuously move in and out to progressively and continuously vary the size of the diaphragm aperture in a periodic relation. It is also apparent that the diaphragm aperture will go through two cycles of operation with each revolution of the shaft 17. Therefore, there will be two points at which the diaphragm opening will be properly adjusted in each revolution of the shaft 17, and either of these points may be utilized to control the instant of exposure.

As in the above structure, a contact or contacts 43 may be carried by the sleeve 42 mounted on and rotated by the shaft 17. In the present embodiment, however, the contact or contacts 43' are preferably carried, as shown in Fig. 7, on the movable ring 75 of the diaphragm 70 and electrically insulated therefrom by the insulating strip 80. As there are two points of proper exposure, in each cycle of movement of the leaves 71 or each rotation of shaft 17 two contacts 43' may be employed, but as mentioned above in connection with Figs. 4 to 6, only one is preferred. In order that the contact 43' may be effective in connecting the terminals 33 and 34 at the instant of exposure, the ring 40 of the cup 39 is preferably arranged outside of and concentric with the ring 75, as clearly shown in Fig. 7. Thus, each time the light intensity of the cell varies, the ring 40 with its terminals 33 and 34 will move to properly position the terminals 33 and 34, and then when the diaphragm ring 75 has been moved to one of its points of control, the contact 43' will then be moved to a position to connect the terminals 33 and 34 to control the instant of exposure.

The disks 14 and 15, the plates 50 and 51, or the diaphragm 70 of the present invention, thus provide a continuously changing light-transmitting means, the light-transmitting characteristics of which are properly adjusted, at the instant of exposure, in accordance with the light intensity incident upon the cell 35. Also, the control is substantially immediate in its response to changing light conditions. Furthermore, the making of exposures is directly under the control of the light-sensitive member which controls the instant of the exposure in accordance with the light conditions to insure that the proper portions of the light-transmitting means will be in position or will be properly adjusted when an exposure is made. Also, the delay in exposure is automatic thus relieving the operator of any necessity to vary the exposure due to varying light conditions. In the first two embodiments shown in Figs. 1 to 6, the control means does not have to be located at any certain position in regard to the camera lens and, hence, can be conveniently located in front of the camera lens. Finally, as the delay between the closing of the switch 31 and the making of the exposure is very small, there will be no possibility of the light conditions changing during the small interval so that the exposure will be properly made.

While some embodiments of the invention have been disclosed, it is to be understood that the inventive idea may be carried out in a number of ways. This application is, therefore, not to be limited to the precise details described, but is intended to cover all variations and modifications thereof falling within the scope of the appended claims.

I claim:

1. In a photographic apparatus, the combination with a camera having a lens, of variable light transmitting means positioned in the path of light rays passing to said lens, means for continuously moving said light transmitting means transversely of said path to continuously vary the amount of light transmitted to said lens, means including a shutter for controlling the exposure for said camera, a light sensitive cell and means actuated by said cell for controlling the time of operation of said exposure control means in definite relation to the position of said light transmitting means relative to said path.

2. In a photographic apparatus, the combination with a camera having a lens, of variable light transmitting means positioned in the path of light rays passing to said lens, means for continuously moving said light transmitting means transversely of said path to continuously vary the amount of light transmitted to said lens, means including a shutter for controlling the exposure for said camera, a light-sensitive cell, and means including an electro-magnetic member actuated in response to light rays incident on said cell for controlling the time of operation of said exposure control means in definite relation to the portion of said light transmitting means positioned in said path.

3. In a photographic apparatus, the combination with a camera having a lens, of variable light transmitting means positioned in the path of light rays passing to said lens, means for continuously rotating said light transmitting means transversely of said path to continuously vary the amount of light transmitted to said lens, means including a shutter for controlling the exposure for said camera, a light-sensitive cell, an electro-magnetic member operatively connected to and controlled by said cell, and a rotor of said electro-magnetic member adapted to be variably positioned in accordance with the energization of said cell by the light rays incident thereon for controlling the time of actuation of said exposure control means in definite relation to the position of said light transmitting means relative to said path.

4. In a photographic apparatus, the combination with a camera having a lens, of variable light transmitting means positioned in the path of light rays passing to said lens, means for continuously rotating said light transmitting means transversely of said path to continuously vary the amount of light transmitted to said lens, means including a shutter for controlling the exposure for said camera, a light-sensitive cell, an electro-magnetic member operatively connected to and controlled by said cell, a rotor for said electro-magnetic member adapted to be variably moved about its axis in accordance with the energization of said light-sensitive cell by the light rays incident thereon, and means movable by said rotor for controlling the time of operation of said exposure control means in definite relation to the position of said light transmitting means relative to said path.

5. In a photographic apparatus, the combination with a camera having a lens, of variable light transmitting means positioned in the path of light rays passing to said lens, means for moving said light transmitting means transversely of said path, an electrically operated exposure control means including a shutter, a light-sensitive cell, contact means in the circuit of said exposure control means variably positionable by said cell, and means moved by said light transmitting means and cooperating with the means in said circuit to cause the latter to be energized to operate said exposure control means in timed relation to the positioning of said light transmitting means relative to said path.

6. In a photographic apparatus, the combination with a camera having a lens, of variable light transmitting means positioned in the path of light rays passing to said lens, means for moving said light transmitting means transversely of said path, an electrically operated exposure control means including a shutter, a light-sensitive cell, a normally open switch member arranged in the circuit of said exposure control means, means controlled by said cell for variably positioning said switch in accordance with the energization of said cell and means actuated by said light transmitting means for closing said switch to operate said exposure control means in timed relation to the positioning of said light transmitting means relative to said path.

7. In a photographic apparatus, the combination with a camera having a lens, of variable light transmitting means positioned in the path of light rays passing to said lens, means for moving said light transmitting means transversely of said path, an electrically operated exposure control means including a shutter, a light sensitive cell, a normally open switch member arranged in the circuit of said exposure control means, means controlled by said cell for variably positioning said switch in accordance with the energization of said cell, a rotary switch closing member rotated by said moving means for momentarily closing said switch to control the operation of said exposure control means in timed relation to the positioning of said light transmitting means relative to said path.

8. In a photographic apparatus, the combination with a camera having a lens, of variable light transmitting means positioned in the path of light rays passing to said lens, means for moving said light transmitting means transversely of said path, an electrically operated exposure control means including a shutter, a light sensitive cell, a member variably positioned in accordance with the energization of said light sensitive cell, terminals for the circuit of said exposure control means carried by said member, and a bridging contact operated by said moving means and arranged to connect said terminals to control the operation of said exposure control means in timed relation to the positioning of said light transmitting means relative to said path.

9. In a photographic apparatus, the combination with a camera having a lens, of variable light transmitting means positioned in the path of light rays passing to said lens, means for moving said light transmitting means transversely of said path, an electrically operated exposure control means including a shutter, a light sensitive cell, a member variably positioned in accordance with the energization of said cell, terminals for the circuit of said exposure control means carried by said member, and a bridging contact moved by said drive means in synchronism with said light transmitting means for connecting said contacts to energize said circuit to operate said exposure control means in timed relation to the positioning of said light transmitting means relative to said path.

10. In a photographic apparatus, the combination with a camera having a lens, of variable light transmitting means positioned in the path of light rays passing to said lens, means for moving said light transmitting means transversely of said path, an electrically operated exposure control means including a shutter, a light sensitive cell, a main switch positioned in the circuit of said electrically operated exposure control means, a normally open switch arranged in said circuit, means controlled by said cell for positioning said last mentioned switch in accordance with the energization of said cell by the light rays incident thereon, and a continuously driven member operating in synchronism with the movement of said light transmitting means for closing said switch to control the operation of said shutter in timed relation to the positioning of said light transmitting means relative to said path.

11. In a photographic apparatus, the combination with a camera having a lens, of variable light transmitting means positioned in the path of light rays passing to said lens, means for moving said light transmitting means transversely of said path, means including a shutter for controlling the exposure for said camera, a light sensitive cell, electrical means for actuating said exposure control means, a pair of terminals arranged in the circuit of said electrical means and operatively connected to said cell and positionable thereby in accordance with the light intensity thereon, and a rotary contact operated in synchronism with said light transmitting means to connect said terminals to close said circuit to actuate said exposure control means in timed relation to the movement of said light transmitting means.

12. In a photographic apparatus, the combination with a camera having a lens, of variable light transmitting means positioned in the path of light rays passing to said lens, means for moving said light transmitting means transversely of said path, means including a shutter for controlling the exposure for said camera, a light sensitive cell, electrical means for actuating said exposure control means, an electro magnetic means operatively connected to said cell, a ring controlled by said electro magnetic means and variably positionable in accordance with the energization of said cell by the light rays incident thereon, a pair of contacts carried by said ring and connected into the circuit of said electrical actuating means, a rotary contact positioned within said ring and arranged to bridge said pair of contacts to close said electrical means to permit the actuation of said exposure control means, and means for moving said rotary contact in synchronism with said light transmitting means to control the actuation of said exposure control means in timed relation with the movement of said light transmitting means.

13. In a photographic apparatus, the combination with a camera having a lens, a graded annular density wedge mounted for rotative movement across the path of the light rays passing to said lens, means for continuously rotating said wedge at a uniform speed, a shutter actuating mechanism, electrical means operatively connected to said mechanism to actuate the latter, a light sensitive cell, an electro magnetic member operatively connected to said cell and energized by the light falling upon said cell, a rotor for said member variably positionable in accordance with the energization of said cell, an annular member carried by said rotor and movable as a unit therewith, a pair of terminals carried by said annular member and connected into the circuit of said electrical means, and a rotary contact operatively connected to and rotated in synchronism with said wedge to momentarily connect said contacts to energize said electrical means to operate said shutter in timed relation to the rotation of said wedge.

14. In a photographic apparatus, the combination with a camera having a lens, a pair of oppositely graded annular density wedges arranged in spaced relation along the optical axis of said lens to intercept the light rays passing thereto, means for continuously rotating said wedges at the same speed but in opposite directions to provide light transmitting means of continuously changing density positioned in the path of said rays, a shutter actuating mechanism, electrical means for controlling the operation of said actuating mechanism, a light sensitive cell, an electro magnetic member electrically connected to said cell, a rotor for said member variably positionable in accordance with the energization of said cell by the light rays incident thereon, an annular member carried by said rotor and movable as a unit therewith, a pair of contacts carried by said annular member and connected into the circuit of said electrical means, a rotary selector contact mounted within and concentric with said annular member and arranged to connect said pair of contacts to complete the circuit of said electrical means, means for operatively connecting said selector contact to said density wedges so as to rotate in synchronism therewith to control the connecting of said pair of contacts so that the actuation of said shutter will be in a definite timed relation to the rotation of said wedges.

15. In a photographic apparatus, the combination with a camera having a lens, of a continuously varying light transmitting means positioned in the path of light rays passing through said lens, exposure control means for said camera, a light sensitive cell, and means actuated by said cell for controlling the operation of said exposure control means in timed relation to the variation of said light transmitting means.

16. In a photographic apparatus, the combination with a camera having a lens, of a variable light transmitting means positioned in the path of light rays passing through said lens, means for continuously and uniformly moving said light transmitting means transversely of said path, exposure control means for said camera, a light sensitive cell actuated by the intensity of light incident thereon, and means variably positioned by said cell for controlling the instant of operation of said exposure control means only when the light transmitting means has been moved to a position so that the light transmitting characteristics thereof are in a definite relation to the light intensity incident on said cell.

17. In a photographic apparatus, the combination with a camera having a lens, a continuously and periodically variable light transmitting means positioned in the path of light rays passing through said lens, means for uniformly and continuously moving said light transmitting means transversely of said path, exposure control means for said camera, a light sensitive cell variably actuated by the intensity of light incident thereon, and means positionably and actuated by said cell in relation to the intensity of the light incident thereon to control the instant of operation of said exposure control means at a definite point in the cycle of said light transmitting means.

18. In a photographic apparatus, the combination with a camera having a lens, of variable light transmitting means including a variable density wedge positioned in the path of light rays passing to said lens, means for continuously and uniformly reciprocating said wedge transversely of said path, means including a shutter for controlling the exposure for said camera, a light sensitive cell, and means actuated by said cell for controlling the instant of operation of said exposure control means in definite relation to the position of said density wedge relative to said path.

19. In a photographic apparatus, the combination with a camera having a lens, of variable light transmitting means comprising a pair of oppositely oriented variable density wedges positioned in the path of light rays passing to said lens, means for uniformly and continuously reciprocating said wedges in opposite directions transversely of said path, means including an electrically operated shutter for controlling the exposure for said camera, a light sensitive cell, electrical contacts arranged in the circuit of said exposure control means and variably positioned in response to the light intensity on said cell, and a single contact operatively connected to said wedges and arranged to connect said electrical contacts to control the instant of operation of said shutter in proper timed relation to the movement of said wedges across said path.

20. In a photographic apparatus, the combination with a camera having a lens, an iris diaphragm positioned in the path of light rays passing through said lens, means for operating said diaphragm for continuously and uniformly varying the aperture thereof, a light sensitive cell, means including an electrically actuated shutter for controlling the camera exposure, a pair of terminals connected in the circuit of said shutter control and operatively connected to said cell and variably positioned in response to varying light intensity thereon, and a selector contact movable by said diaphragm operating means and adapted to connect said terminals to operate said shutter only when the opening of said diaphragm is in accordance with the light intensity on the cell.

BENJAMIN E. LUBOSHEZ.